(12) United States Patent
Johnson et al.

(10) Patent No.: US 6,832,286 B2
(45) Date of Patent: Dec. 14, 2004

(54) MEMORY AUTO-PRECHARGE

(75) Inventors: Jerome J. Johnson, Spring, TX (US);
Benjamin H. Clark, Spring, TX (US);
Gary J. Piccirillo, Cypress, TX (US);
John M. MacLaren, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 382 days.

(21) Appl. No.: 10/179,081

(22) Filed: Jun. 25, 2002

(65) Prior Publication Data
US 2003/0236959 A1 Dec. 25, 2003

(51) Int. Cl.[7] .............................................. G06F 12/00
(52) U.S. Cl. ...................................... 711/105; 711/167
(58) Field of Search ................................ 711/105, 167

(56) References Cited

U.S. PATENT DOCUMENTS

| | | | |
|---|---|---|---|
| 5,930,496 A | 7/1999 | MacLaren et al. | 395/500 |
| 6,052,513 A | 4/2000 | MacLaren | 395/294 |
| 6,055,590 A | 4/2000 | Pettey et al. | 710/56 |
| 6,160,562 A | 12/2000 | Chin et al. | 345/520 |
| 6,167,960 B1 | 1/2001 | Moya | 166/105.1 |
| 6,199,118 B1 | 3/2001 | Chin et al. | 701/1 |
| 6,209,052 B1 | 3/2001 | Chin et al. | 710/109 |
| 6,216,190 B1 | 4/2001 | Chin et al. | 710/128 |
| 6,247,102 B1 | 6/2001 | Chin et al. | 711/150 |
| 6,272,651 B1 | 8/2001 | Chin et al. | 714/43 |
| 6,279,065 B1 | 8/2001 | Chin et al. | 710/129 |
| 6,286,083 B1 | 9/2001 | Chin et al. | 711/151 |
| 6,321,286 B1 | 11/2001 | Goodrum et al. | 710/129 |
| 6,356,972 B1 | 3/2002 | Chin et al. | 710/310 |
| 6,470,433 B1 * | 10/2002 | Prouty et al. | 711/168 |

* cited by examiner

*Primary Examiner*—Jack Lane

(57) ABSTRACT

A computer system includes a plurality of memory modules that contain semiconductor memory, such as DIMMs. The system includes a host/data controller that utilizes an XOR engine to store data and parity information in a striped fashion on the plurality of memory modules to create a redundant array of industry standard DIMMs (RAID). To optimally run back to back cycles to the memory modules, a technique for providing de-rating parameters such that unnecessary latencies designed into the memory devices can be removed while the system is executing requests. By removing any unnecessary latency, cycle time and overall system performance can be improved.

28 Claims, 5 Drawing Sheets

MEMORY AUTO-PRECHARGE

BACKGROUND OF THE INVENTION

1. Field of the Invention

This invention relates generally to memory systems and, more particularly, to memory systems with reduced memory latency.

2. Background of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

In today's fast paced world, computer system reliability and performance has become increasingly important. As system architectures become increasingly more complex and as processor speeds are increased through advances in technology, optimizing system performance becomes more difficult. System performance depends in part on the bandwidth and latency of the system's memory. Typically, memory latency refers to access time and cycle time. Access time is the time between when a read is requested and when the desired data arrives at the requesting device. The cycle time refers to the amount of time between requests to memory. Accessing memory with the lowest latency and the highest use of memory bandwidth is advantageous in computer systems. The longer it takes to access memory (access time) and complete a request (cycle time), the slower the performance of the computer system. Thus, any reduction in access time and/or cycle time may improve system performance.

The present invention may be directed to one or more of the problems set forth above.

BRIEF DESCRIPTION OF THE DRAWINGS

The foregoing and other advantages of the invention will become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
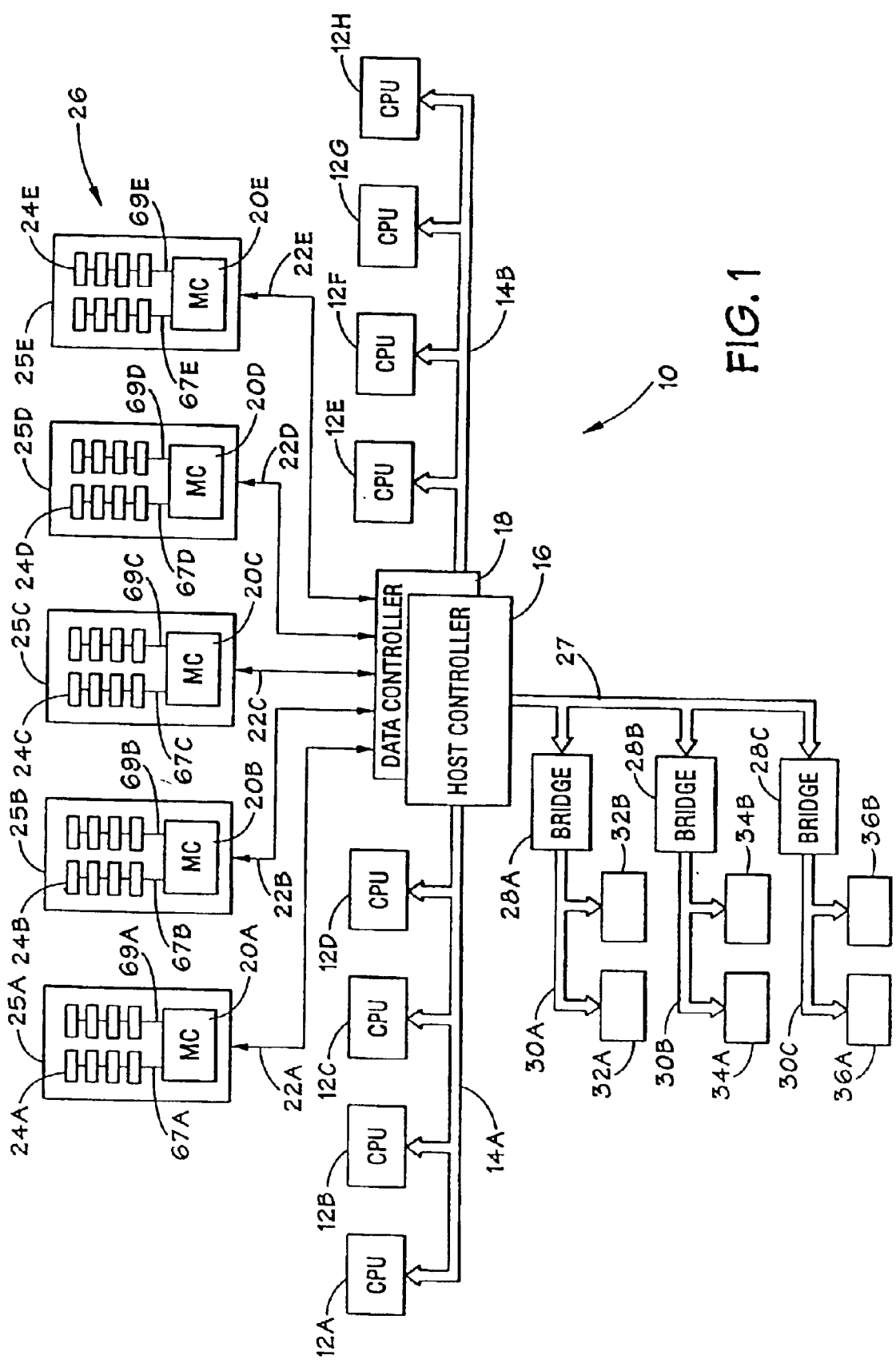
FIG. 1 is a block diagram illustrating an exemplary computer system.

Turning now to the drawings and referring initially to FIG. 1, a block diagram of an exemplary computer system with multiple processor buses and an I/O bus is illustrated and generally designated as reference numeral 10. The computer system 10 typically includes one or more processors or CPUs. In the exemplary embodiment, the system 10 utilizes eight CPUs 12A–12H. The system 10 utilizes a split-bus configuration in which the CPUs 12A–12D are coupled to a first bus 14A and the CPUs 12E–12H are coupled to a second bus 14B. It should be understood that the processors or CPUs 12A–12H may be of any suitable type, such as a microprocessor available from Intel, AMD, or Motorola, for example. Furthermore, any suitable bus configuration may be coupled to the CPUs 12A–12H, such as a single bus, a split-bus (as illustrated), or individual buses. By way of example, the exemplary system 10 may utilize Intel Pentium III processors and the buses 14A and 14B may operate at 100/133 MHz.

Each of the buses 14A and 14B is coupled to a chip set which includes a host controller 16 and a data controller 18. In this embodiment, the data controller 18 is effectively a data cross bar slave device controlled by the host controller 16. Therefore, these chips may be referred to together as the host/data controller 16,18. The host/data controller 16,18 is further coupled to one or more memory controllers. In the present exemplary embodiment, the host/data controller 16,18 is coupled to five memory controllers 20A–20E via five individual memory bus segments 22A–22E, respectively. As will be discussed further herein, the individual memory bus segments 22A–22E (also referred to collectively as "MNET") may facilitate the removal of individual memory cartridges. Each of the memory controllers 20A–20E is further coupled to a segment of main memory designated as 24A–24E, respectively. As discussed in detail below, each of the memory segments or modules 24A–24E is typically comprised of dual inline memory modules (DIMMs). Further, each memory module 24A–24E and respective memory controller 20A–20E may comprise a single memory cartridge 25A–25E which may be removable.

Each of the memory controllers 20A–20E and its associated memory segment 24A–24E forms a portion of the main memory array 26. The five memory controllers 20A–20E operate in lock-step. In this example, the data is striped and each of the memory controllers 20A–20E handles a separate quad-word of each cacheline of data (assuming a 32 byte cacheline) that is being transferred to or from the host and data controllers 16 and 18. For example, the memory controller 20A handles the first quad-word of every data read and write transaction, the memory controller 20B handles the second quad-word, the memory controller 20C handles the third quad-word, and the memory controller 20D handles the fourth quad-word. Instead of receiving one of the four quad-words, the memory controller 20E handles data parity for the four quad-words handled by the memory controllers 20A–20D. Thus, the memory array 26 forms a "redundant array of industry-standard DIMMs" (RAID) memory structure. By striping each cacheline of data to produce four quad-words and directing each quad-word to an independent memory controller 20A–20E, memory bandwidth is advantageously increased.

The memory segments may be organized on a single channel or on 2N channels, where N is an integer. In this particular embodiment, each of the memory segments 24A–24E is divided into two channels—a first channel 67A–67E and a second channel 69A–69E, respectively. Since each memory segment 24A–24E in this embodiment is capable of containing up to eight DIMMs, each channel is adapted to access up to four of the eight DIMMs. Because this embodiment includes two channels, each of the memory controllers 20A–20E essentially comprises an ASIC which includes two independent memory controllers, as further described below with reference to FIG. 3.

The host/data controller 16,18 is typically coupled to one or more bridges 28A–28C via a suitable bus 27. The opposite side of each bridge 28A–28C is coupled to a respective bus 30A–30C, and a plurality of peripheral devices 32A and B, 34A and B, and 36A and B may be coupled to the respective buses 30A, 30B, and 30C. The bridges 28A–28C may be any of a variety of suitable types, such as PCI, PCI-X, EISA, AGP, etc.

Figure 2:
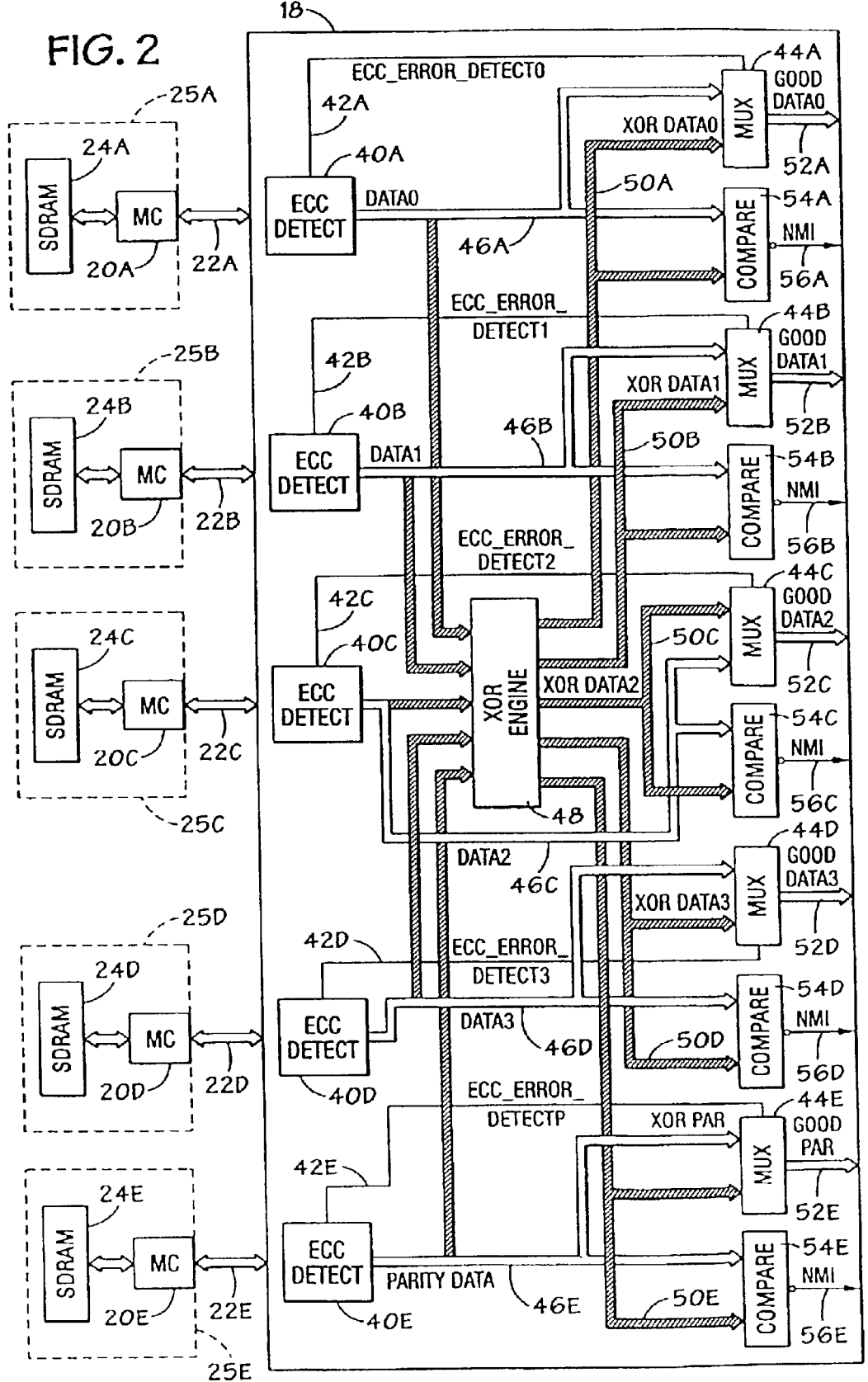
FIG. 2 is a block diagram generally illustrating one implementation of a RAID architecture.

The manner in which the exemplary "4+1" RAID architecture functions will now be explained with reference to FIG. 2. During a memory read operation, a quad-word from each of the first four memory segments 24A–24D and parity from the one remaining memory segment 24E are transmitted to the respective memory controllers 20A–20E. Each memory controller 20A–20E includes error detection and correction algorithms. When operating in X4 memory mode (i.e., implementing 4-bit wide memory devices), each of the memory controllers 20A–20E uses an ECC algorithm to detect single bit memory errors and a single bit error correction algorithm to correct any single bit errors detected by the ECC algorithm. When operating in X8 memory mode (i.e., implementing 8-bit wide memory devices), each of the memory controllers 20A–20E uses an ECC algorithm to detect single bit errors, but such errors are not corrected by the memory controllers 20A–20E.

Once the memory controllers 20A–20E have processed the data as discussed above, the data is transferred via the respective memory buses 22A–22E to the host/data controller 16,18. As in the memory controllers 20A–20E, the host/data controller 16,18 includes ECC modules 40A–40E to detect and correct single-bit errors and detect multi-bit errors in each of the four quad-words and the parity information delivered from the respective memory controllers 20A–20E. As with the ECC algorithm in the memory controllers 20A–20E, correctable single bit errors may be corrected by the ECC algorithm in the ECC modules 40A–40E. For uncorrectable single-bit errors and multi-bit errors, another data correction mechanism is advantageously provided.

The outputs 42A–42E of each of the ECC modules 40A–40E are coupled to a respective multiplexer 44A–44E. Based on the output 42A–42E of each of the ECC modules 40A–40E, each respective multiplexer 44A–44E selects between the original data delivered to the multiplexers 44A–44E on respective buses 46A–46E and the re-created data generated by the exclusive OR (XOR) engine 48 delivered to the multiplexers 44A–44E via the respective buses 50A–50E. Specifically, if one of the ECC modules 40A–40E detects a multi-bit error, the ECC module 40A–40E switches its respective multiplexer 44A–44E such that the bad data on the respective bus 46A–46E is replaced by the good re-created data available on the respective bus 50A–50E. Thus, when operating in X4 memory mode, the XOR engine 48 is used to correct multi-bit errors only, while when operating in X8 memory mode, the XOR engine 48 corrects both single bit errors and multi-bit errors.

When operating in X4 memory mode, each memory segment 24A–24E may exhibit a single bit error which may be corrected without even triggering the use of the re-created data generated by the XOR engine 48. However, only a single multi-bit error on one of the memory segments 24A–24E can be corrected per each memory transaction using the XOR engine 48. Conversely, when operating in X8 memory mode, the host/data controller 16,18 can correct only one single bit error or multi-bit error in one of the memory segments 24A–24E. Thus, if more than one of the memory segments 24A–24E exhibits a single bit error or a multi-bit error in X8 memory mode, or if more than one of the memory segments 24A–24E exhibits a multi-bit error in X4 memory mode, the XOR engine 48 will be unable to create good data to be transmitted out of the host/data controller 16,18 on the buses 52A–52E. In these circumstances, the comparator circuits 54A–54E, which receive the data on the respective bus errors 46A–46E and 50A–50E, deliver a non-maskable interrupt (NMI) on the respective lines 56A–56E. The NMI is typically delivered to the requesting device to indicate that a memory error has occurred and that the requested data cannot be delivered.

Figure 3:
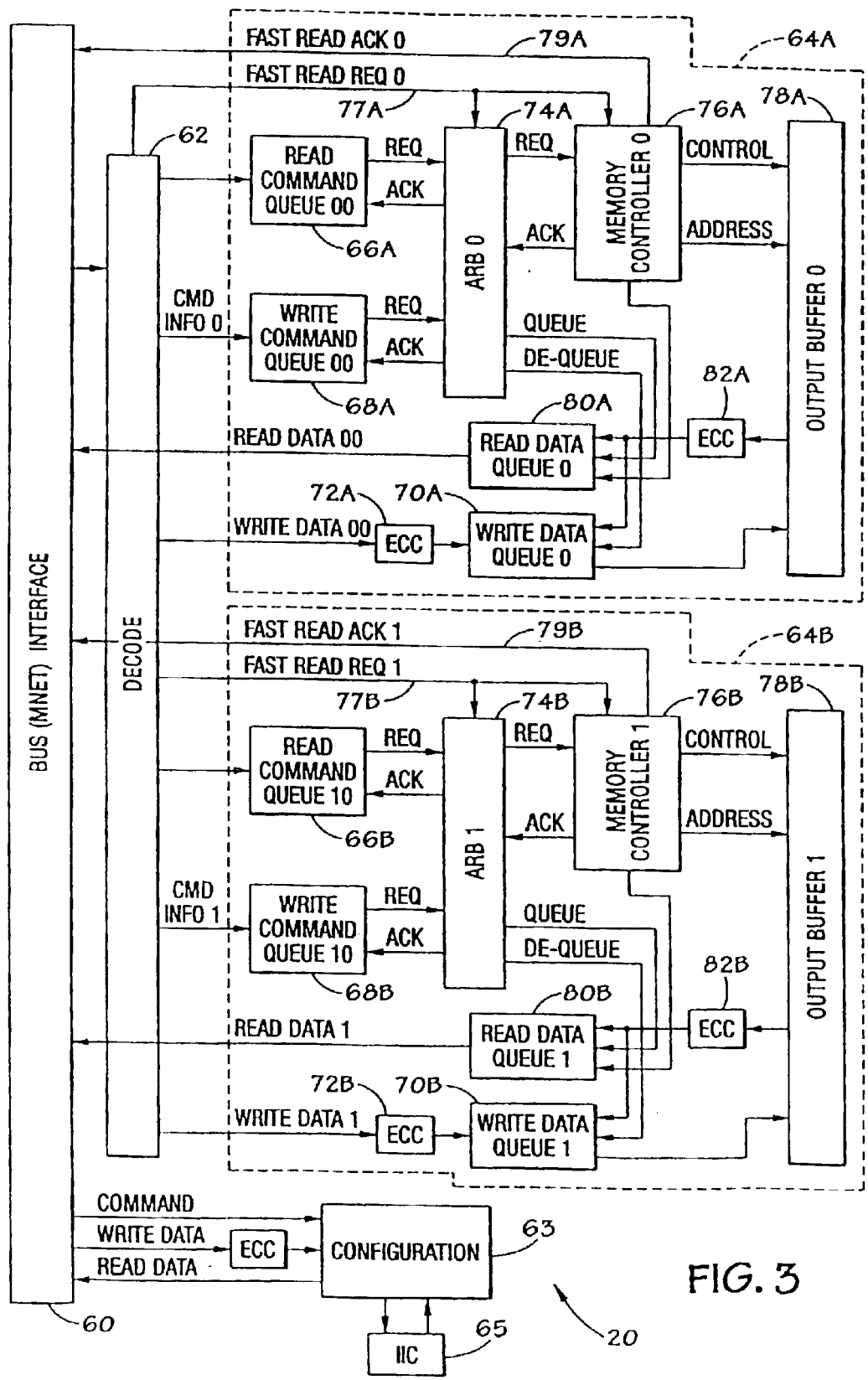
FIG. 3 is a block diagram illustrating an exemplary memory controller.

A block diagram of an exemplary memory controller 20 is illustrated in FIG. 3. The memory controller 20 includes a bus interface 60 that is coupled to the respective memory bus segment 22A–22E to enable the memory controller 20 to pass data to and from the memory bus 22. In this example, the bus interface 60 communicates between the memory bus 22, which may operate at 400 MHz, for instance, and internal decode logic 62, which may operate at 100 or 133 MHz, for instance. One primary function of the bus interface 60 is to meet the protocol and timing requirements of the MNET or memory bus 22 for receiving write data and commands and for transmitting read data and status.

The decode logic 62 decodes the destination of read and write transactions according to the commands from the memory bus 22, as well as the internal set of configuration registers 63. In the case of memory transactions, the decode logic 62 generates the bank address, chip-select signals, and row and column addresses, as further described below. Commands, write data, and read data may be transferred between the decode logic 62 and the configuration registers 63 for a variety of reasons. For example, the configuration registers 63 may be used to store different CAS latencies, parameters that dictate memory controller operation, log information, ID information, and error capturing logic. The configuration registers 63 are coupled to an IIC bus 65 to permit communication with the DIMMs.

The decoded information from the decode logic 62 is then delivered to one of two identical memory controller circuits 64A and 64B, each of which controls a respective first channel 67 and a respective second channel 69. By interleaving the commands between channels, memory latency may be advantageously reduced. The memory controller circuit 64A generally handles the even cachelines for the first channel 67, while the memory controller circuit 64B generally handles the odd cachelines for the second channel 69. Read and write command information from the decode logic 62 is delivered, respectively, to the read command queues 66A and 66B and the write command queues 68A and 68B. Write data is delivered from the decode logic 62 to respective write data queues 70A and 70B. In this embodiment, each of the write data paths includes a respective ECC module 72A and 72B that is designed to detect and correct single bit errors in the write data before it reaches the respective write data queues 70A and 70B.

The read command and write command information from the queues 66A and 66B, 68A and 68B is delivered to a respective arbitration logic circuit 74A and 74B. The arbitration logic 74A and 74B controls transaction timing to the memory modules, and is typically employed to maximize bus bandwidth. The arbitration logic 74A and 74B delivers a request signal to a respective memory controller 76A and 76B which provides control and address information to a respective output buffer 78A and 78B. The arbitration logic 74A and 74B, in conjunction with the respective memory controller 76A and 76B also queues and/or dequeues write data stored in the write data queues 70A and 70B. It should also be noted that this embodiment includes fast read request lines 77A and 77B and fast read acknowledgement lines 79A and 79B. The fast read request lines 77A and 77B deliver a fast read request from the decode logic 62 to the respective memory controller 76A and 76B to request a read operation that bypasses the read command queue 66A and 66B—an operation that is permitted to reduce latency and improve timing during certain situations where the read command queue is empty. If the operation is permitted, an acknowledgement is transmitted from the respective memory controller 76A and 76B to the bus interface 60 on the fast read acknowledgement lines 79A and 79B. Alternatively, the fast read acknowledgment may be sent directly to the read command queues 66A and 66B.

During a read transaction, the data received from the DIMMs is transferred to a respective read data queue 80A and 80B. As with the write data, the read data may also be passed through a respective ECC circuit 82A and 82B to detect and optionally correct any single bit errors prior to the data reaching the respective read data queue 80A and 80B. The arbitration logic 74A and 74B, in conjunction with the memory controllers 76A and 76B, also controls the queuing and dequeuing of data in the read data queues 80A and 80B. Read data is delivered from the read data queues 80A and 80B to the bus interface 60 for transmission on the bus 22.

When a memory cycle is sent to a memory controller 20A–20E, the system address is mapped to a memory address. A memory address includes a chip select, bank address, row address, and column address. The chip select designates to which DIMM in a particular memory segment 24A–24E the cycle is targeted. The bank address selects to which bank within the DIMM the cycle is targeted. The row address selects a group of data words (called a "row") within a bank. The column address selects the specific data word from the group of words of a given row address. The memory address is generally provided such that the least significant bits indicate the column address and the most significant bits indicate the chip select.

Sequential system accesses to consecutive cachelines (assuming a 32 byte cacheline) access addresses 0h, 20h, 40h, 60h. In traditional systems, these memory accesses are directed to chip select 0, bank 0, row 0, and col 0h, 4h, 8h, Ch. The length of each cacheline access is four data words. Since these accesses are to the same bank, traditional memory controllers typically open a bank and access each of the four columns used to store the 32-byte cacheline before closing the bank. Before accessing the same bank on the same DIMM, the open bank is closed by running a precharge command. Disadvantageously, running multiple accesses to rows and columns in a single bank slows system performance because of the conflicts induced by repeated activity along the same buses and the continual targeting of the same DIMM, as discussed further below.

Each memory device (e.g., SDRAM) may include four banks. When a read or write command is issued to a particular bank, the bank is opened. Once the bank is opened, the read or write command is asserted at some time after opening the bank. Finally, at some time after the assertion of the read or write command, the bank is closed. One mechanism for reducing overall cycle time and increasing system performance is to close a bank immediately following an access to a single column, rather than accessing multiple columns while the bank is open. This may be accomplished by asserting read and write commands with an auto-precharge.

However, timing parameters may present significant design considerations. These timing parameters, such as the time between opening a bank and asserting a command, the time between asserting a command and closing the bank, the time between opening one bank and opening another bank (or re-opening the same bank), and the time between asserting a command and opening another bank (or re-opening the same bank), create complex timing issues related to accessing memory. The Intel PC100 specification does not clearly define these timing parameters. Thus, memory device manufacturers such as Mitsubishi, Samsung, Hitachi, etc., may design devices to ensure that PC100 compliance is met while sacrificing cycle time in the processing of each request. To optimize the request processing speed, certain timing parameters for particular memory devices may be determined and configuration registers may be incorporated to scale back or "de-rate" the time delays between certain events during the read and write requests.

Figure 4:
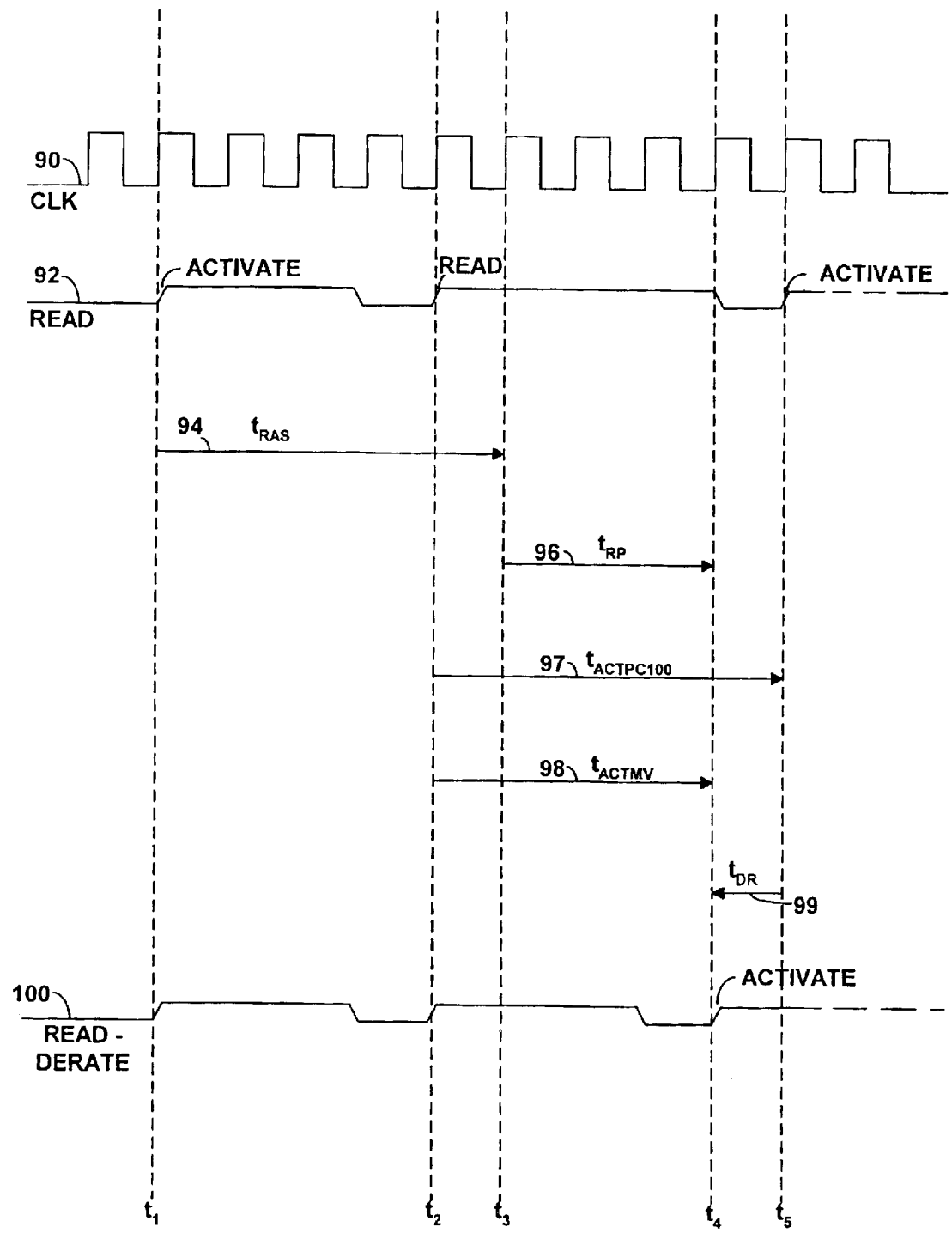
FIG. 4 illustrates a timing diagram illustrating exemplary de-rating techniques for a read request in accordance with the present invention.

FIG. 4 is a timing diagram illustrating the timing parameters and de-rating techniques described above with respect to read commands. The Intel PC100 specification does not clearly define where an "auto-precharge" may occur. "Auto-precharge" refers to the closing of a bank after a command (here the read command) has been asserted. Read de-rating reduces the time from the assertion of one read command to the opening of the bank associated with the immediately subsequent read command. While the timing parameters associated with the processing of read commands are known by the system hardware, the use of these parameters is often ambiguously described in associated specifications.

In general, the Intel PC100 specification implies the timing of the auto-precharge by defining when the immediately subsequent bank is opened or "activated." For read commands, the "next activation" occurs at a time (i.e. a number of clock cycles) equal to the auto-precharge (AP) to the next activation ($t_{RP}$) plus the burst length BL plus the CAS latency (CL) minus 2. Each of the parameters $t_{RP}$, BL, and CL are stored on a device, such as a serial presence detect (SPD) device for a corresponding DIMM. Thus, according to the PC100 specification, the time from the assertion of a first command to the opening of the bank associated with the immediately subsequent command may be represented by the following equation:

$$t_{ACT} = t_{RP} + BL - CL - 2$$

Memory vendors, on the other hand, define where an auto-precharge may occur as a simple product of the burst length BL. For a memory read command, the auto-precharge may occur at a burst length BL after the time the read command is asserted. That is to say:

AP=BL after the command

By being overly conservative, PC100 requirements may unnecessarily add cycle time to the optimal capabilities defined by the memory vendors. To optimize the cycle time, a read de-rating configuration register may be added to the configuration register 63 (FIG. 3) to scale back the assertion of the read command to the earliest time at which it may occur within the capabilities of the memory devices being implemented in the system. The timing parameters defined by the particular memory device used in the memory system are used to calculate any de-rating that may be possible. Once the de-rating is determined for the read command, the de-rating value may be stored in the read de-rating register in the configuration register 63. The timing diagram illustrated in FIG. 4 may be helpful in further describing the timing parameters discussed above.

A clock signal is illustrated as the clock signal 90. The clock signal 90 may be generated in the host/data controller 16,18 and may be delivered to the memory controllers 20A–20E via the respective memory buses 22A–22E (as illustrated in FIG. 1). As previously described, the present system may operate at a burst length BL of one. That is to say, that a single quad word may be delivered to or from the memory on a single clock cycle. An exemplary read command timing scheme is illustrated by signal 92. At a time $t_1$, the bank corresponding the address to which the read command is directed is opened or "activated." As defined by the specification of the particular memory device implemented in the system, the earliest a bank may be closed once it is opened may be defined by the time period $t_{RAS}$, illustrated as $t_{RAS}$ 94. In other words, the $t_{RAS}$ timing represents the earliest an auto-precharge AP may occur after the bank has been activated, illustrated here at time $t_3$. Thus, in the present embodiment, the earliest that the auto-precharge may occur is five clock cycles after the bank has been opened, as illustrated in FIG. 4, because $t_{RAS}=t_3-t_1=$ five clock cycles. In accordance with the memory vender specification, knowing that the auto-precharge may occur no sooner than time $t_{RAS}$ after the bank is activated, the read command may be asserted a burst length or one clock cycle before the $t_{RAS}$ (for a burst length of 1). In other words, the read command is asserted at $t_2$ which equals ($t_{RAS}$–BL) clocks after the activate at time $t_1$.

The timing signal $t_{RP}$, illustrated by reference numeral 96, represents the minimum timing from when an auto-precharge may occur, here at time $t_3$, until the next bank may be opened (i.e., the next activate may be initiated), here at time $t_5$. It should be noted that the "next bank" is actually the same bank being re-opened, as can be appreciated by those skilled in the art. According to the PC100 specification, the time $t_{ACT}$, which is the time from the assertion of the read command ($t_2$) to the re-opening or activation of the next bank ($t_5$), may be defined by the following equation:

$$t_{ACT}=(CL+BL-2)+t_{RP}$$

However, memory vendors define the time $t_{ACT}$ by the following equation:

$$t_{ACT}=BL+t_{RP}$$

In the presently illustrated example, it can be seen that the PC100 specification may actually be unnecessarily conservative and may under utilize the capabilities of the memory devices, as designed by the memory vendors. Consider a memory device with the characteristics illustrated in FIG. 4 and a typical CAS latency CL=3. According to the PC100 specification, the time $t_{ACT}$ equals:

$$t_{ACTPC100} = (CL+BL-2)+t_{RP}$$
$$= (3+1-2)+3$$
$$= 5$$

Thus, as illustrated by the reference numeral 97, $t_{ACTPC100}$ is illustrated as $t_5-t_2$ which is equal to 5 clock cycles. Thus, according to the PC100 specification, the next activation is asserted at time $t_5$, as illustrated.

However, memory vendors define the time $t_{ACT}$ by the following equation:

$$t_{ACTMV} = BL+t_{RP}$$
$$= 1+3$$
$$= 4$$

Thus, the memory device is actually capable of asserting the next activate a clock cycle earlier than the PC100 specification provides. As illustrated by reference numeral 98, $t_{ACTMV}$ equals 4 clock cycles. Because the memory device is capable of asserting the next activate 4 clock cycles after the assertion of the read command, a de-rating value of 1, illustrated as $t_{DR}$, can be used such that the next activate is asserted at time $t_4$, rather than time $t_5$. The system is still designed in compliance with the PC100 specification, but the time $t_{ACT}$ is de-rated such that it is optimized within the design capabilities of the memory device. Thus, the time $t_{ACT}$ can be shown by the following equation:

$$t_{ACT}=(CL+BL-2)+t_{RP}-t_{DR}$$

Essentially, this insures that the next activate occurs at a time equal to the optimal capabilities of the memory device, illustrated as $t_{ACT}$ in the present example. Thus, after de-rating, the next activation may be asserted at time $t_4$ rather than time $t_5$, as illustrated by read de-rate signal 100, thereby saving a clock cycle and increasing system performance. Once the timing parameters for the memory devices are known, a de-rating value $t_{DR}$ (here, 1) can be stored in the read de-rating configuration register, as previously discussed, and accessed on each read command.

Figure 5:
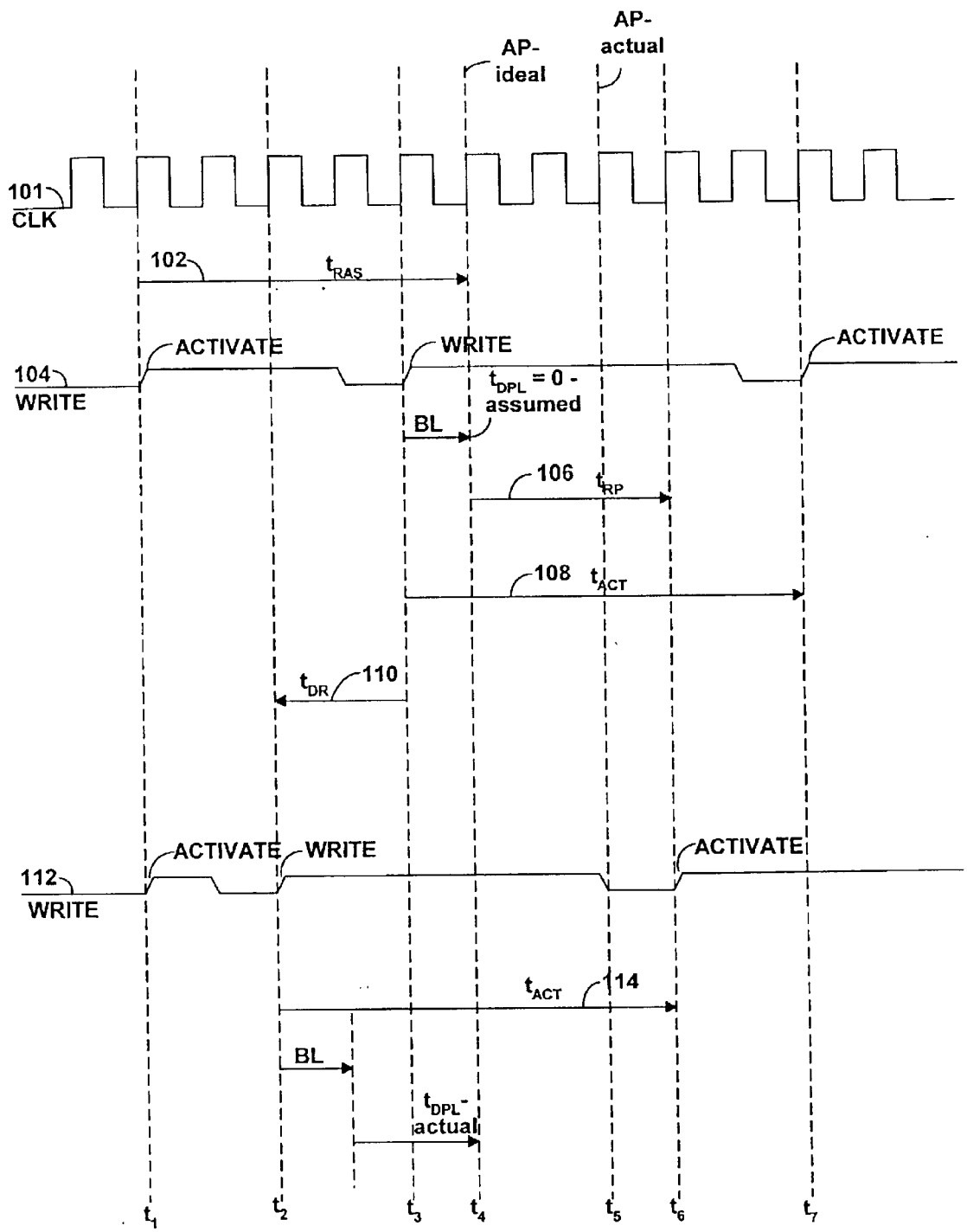
FIG. 5 illustrates a timing diagram illustrating exemplary de-rating techniques for a write request in accordance with the present invention.

Similarly, a write de-rating register may be implemented in the configuration register 63 such that a de-rating of the write command signal may be incorporated. FIG. 5 is a timing diagram illustrating the timing parameters and de-rating techniques described above with respect to write commands. As previously described, the Intel PC100 specification does not clearly define where an auto-precharge may occur. Write de-rating reduces the time from the assertion of the write command of a first request to the next activation by changing where the command of the first request is asserted. The de-rating may optimize memory bandwidth since $t_{DPL}$ and/or $t_{DAL}$ (further described below) are not specified in the SPD.

As with read commands, the Intel PC100 specification defines the timing between the assertion of a first command and the activation for the subsequent request. For write commands, the time from the assertion of the write command to the opening of the next bank (i.e., re-opening of the same bank) being accessed may occur at a time equal to the assertion of the write command to the closing of the bank associated with that command plus the time from the closing of the bank to the opening of the bank associated with the next write command. That is to say that according to the PC100 specification and the memory vendor specification, the time from the assertion of the write command to the next activation may be represented by the following equations:

$$t_{ACT} = t_{DAL} + BL$$

$$\text{where } t_{DAL} = t_{DPL} + t_{RP}$$

The time is the time from the assertion of the write command to the next activation (i.e. the re-opening of the bank). The time $t_{DAL}$ is the time from the end of the data stream after the assertion of the write command to the next activation. The time $t_{DPL}$ is the write recovery time (i.e. the command to pre-charge time). The time $t_{RP}$ is the time from the closing of the bank to the re-opening of the bank associated with the next command (i.e. pre-charge to activate time).

Unlike other timing parameters which may be stored in an SPD associated with each DIMM, $t_{DPL}$ can only be determined by referencing data books or vendor specifications. During operation, $t_{DPL}$ and/or $t_{DAL}$ values cannot be retrieved from the SPD. Since different vendors may have different values which cannot be determined by the system at the time the system is designed, a value of zero is generally assumed. For intance, one memory vendor may specify the command to auto-precharge time $t_{DPL}$ as X, while a second memory vendor may specify the command to auto-precharge time $t_{DPL}$ as Y, where Y is less than X. Typically, the value X would be used to insure proper operation of the memory devices. If X were chosen, the command could be issued too early, thereby causing the AP to occur too early in violation of the memory specification. Since the command to pre-charge time cannot be determined or calculated from the values stored on the SPD, this implementation assumes a value of zero for $t_{DPL}$, which may cause loss of memory performance. If the command to pre-charge time ($t_{DPL}$) is assumed to be zero when in reality the device is designed with a time $t_{DPL}$ greater than zero, other timing parameters are affected and write request processing speed may be lost. By implementing a write de-rating value, the memory controller may achieve more aggressive timing to optimize memory bandwidth.

The timing diagram illustrated in FIG. 5 may be helpful in further describing the timing parameters discussed above. A clock signal is illustrated as the clock signal 101. As defined by the specification of the particular memory device implemented in the system, the earliest a bank may be closed once it is opened, may be defined by the time period $t_{RAS}$ illustrated as $t_{RAS}$ 102. Accordingly, an exemplary write command timing scheme is illustrated by signal 104. At a time $t_1$, the bank corresponding the address to which the write command is directed is opened or activated. The time $t_{RAS}$ represents the earliest an auto-precharge AP may occur after the bank has been activated, illustrated here at time $t_4$. Thus, in the present embodiment, the earliest that the auto-precharge AP may occur is five clock cycles after the bank has been opened, as illustrated in FIG. 5, because $t_{RAS} = t_4 - t_1 =$ five clock cycles. The timing signal $t_{RP}$ illustrated by reference numeral 106 represents the minimum timing from when an auto-precharge AP may occur, here at time $t_4$, until the next bank may be opened (i.e., the next activate may be initiated), here at time $t_6$. Thus, $t_{RP} = t_6 - t_4 =$ three (3) clock cycles. However, based on system design, the next activate may not occur at the optimal time $t_6$, since a zero $t_{DPL}$ may be assumed but not implemented in actuality, as discussed further below.

As previously described, for write commands, the auto-precharge occurs $t_{DPL}$ after the last data. Here, since the burst length BL is 1, the last data occurs one clock cycle after the assertion of the write command. Since the system is designed to assume a time $t_{DPL}$ equal to zero, the command will be asserted one burst length BL (or here, one clock cycle) before the end of the time period $t_{RAS}$ as indicated at time $t_4$. Thus, the command will be asserted at time $t_3$ and the actual auto precharge will occur at time $t_5$, since the device may have a non-zero time $t_{DPL}$. Accordingly, the time of assertion of the write command (here time $t_3$) may cause the next activation to occur later than necessary to meet Intel PC100 timing requirements. Thus, the timing may be adjusted or de-rated by an amount equal to the write_de-rating value that is stored in the write de-rating configuration register to adjust the timing for the assertion of the write command.

Consider a memory device with the characteristics illustrated in FIG. 5 and a typical time $t_{DPL} = 2$. The system is designed assuming that $t_{DPL}$ was zero and the assertion of the write command was programmed in accordance with this assumption. If however, the time $t_{DPL}$ is actually 2, the next activation will take place at a time $t_{ACT}$ from the assertion of the last command, as indicated by reference numeral 108, and the following equation:

$$t_{ACT} = t_{DAL} + BL$$

$$t_{ACT} = (t_{DPL} + t_{RP}) + BL$$

$$t_{ACT} = (2 + 3) + 1$$

$$= 6$$

Thus, as illustrated in FIG. 5, the next activate for the signal 104 will actually occur at time $t_7$, based on the assertion of the write command at time $t_2$, since $t_{ACT}$=six (6) clock cycles. While this timing assures that the necessary timing requirements are met, this timing does not exercise the optimal performance level to which the memory device is designed.

To optimize the command execution and implement more aggressive timing, a write de-rating value may be implemented to shift the assertion of the write command. In the exemplary embodiment described above and illustrated in FIG. 5, the assertion of the write command can be shifted back two (2) clock cycles from the previous assertion time of $t_3$. By shifting the assertion of the write command back two clock cycles, the next activate will occur at the time $t_6$. The timing requirements for $t_{RAS}$ and $t_{RP}$ are met and the execution of the command is optimized. The write de-rate value is illustrated by the time $t_{DR}$ and designated as reference numeral 110. Here, the time $t_{DR}$ is actually defined as a time from the assertion of the first command assuming a $t_{DPL}=0$. In the present example, the write de-rate value is equal to two (2) clock cycles. A de-rated write command is illustrated by the signal 112. The assertion of the write command occurs at a time $t_{RAS}$ minus the write de-rating value (2). The command is asserted at time $t_2$, as illustrated. By shifting the assertion of the write command two clock cycles to the left (i.e. two (2) clock cycles from the assertion of the command without the de-rating), the next activation will advantageously shift two (2) clock cycles earlier, as well. Once the timing parameters for the memory devices are known, a write de-rating value can be stored in the write de-rating configuration register, as previously discussed. With the shifting of the write assertion from time $t_3$ to $t_2$, the activation time is shifted from time $t_7$ to time $t_6$. The time between the write assertion and the activation (re-opening) of the bank for the write signal 112 is still defined by the time $t_{ACT}$, here six (6) clock cycles, as illustrated by reference numeral 114, but it is shifted two (2) clock cycles to the left. The actual time $t_{DPL}$, which is the time interval from the end of the data (i.e. a burst length after the assertion of the write command) to the auto precharge AP, is illustrated by reference numeral 116. By shifting the time $t_{ACT}$ to the left (i.e. an earlier time), overall write request cycle time is reduced.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of processing a request comprising the acts of:
    opening a bank in a memory device at a first time, and wherein the memory device has corresponding timing parameters;
    asserting a command to the memory device at a second time after the first time;
    closing the bank at a third time after the second time; and
    re-opening the bank at a fourth time after the third time, and wherein the fourth time is dependent on a de-rating value stored in a configuration register.

2. The method of processing a request, as set forth in claim 1, wherein the act of asserting a command comprises the act of asserting a read command, and wherein the read command has a corresponding burst length.

3. The method of processing a request, as set forth in claim 2, wherein the act of asserting a read command comprises the act of asserting a read command with a corresponding burst length equal to one (1).

4. The method of processing a request, as set forth in claim 2, wherein the act of asserting a command comprises the act of asserting a read command at a second time, wherein the second time is a burst length before the third time.

5. The method of processing a request, as set forth in claim 2, wherein the act of closing the bank comprises the act of closing the bank at a time interval $t_{RAS}$ after the act of opening the bank and where $t_{RAS}$ is a parameter correlative to the memory device.

6. The method of processing a request, as set forth in claim 2, wherein the act of re-opening the bank comprises the act of re-opening the bank at a time interval $t_{RP}$ after the act of closing the bank and where $t_{RP}$ is a parameter correlative to the memory device.

7. The method of processing a request, as set forth in claim 6, wherein the act of re-opening the bank comprises the act of re-opening the bank at a time interval $t_{ACT}$ after the act of asserting the command, wherein the time interval $t_{ACT}$ is defined by the relationship:

$$t_{ACT}=(CL+BL-2)+t_{RP}-t_{DR};$$

where CL is the CAS latency, BL is the burst length and $t_{DR}$ is the de-rating value.

8. The method of processing a request, as set forth in claim 1, wherein the act of asserting a command comprises the act of asserting a write command, and wherein the write command has corresponding data having a corresponding burst length.

9. The method of processing a request, as set forth in claim 8, wherein the act of asserting a write command comprises the act of asserting a write command with corresponding data having a burst length equal to one (1).

10. The method of processing a request, as set forth in claim 8, wherein the act of asserting a command comprises the act of asserting a write command at a second time, wherein the second time is a time interval $t_{DR}$ before the third time and wherein the time interval $t_{DR}$ is the de-rating value.

11. The method of processing a request, as set forth in claim 8, wherein the act of closing the bank comprises the act of closing the bank at a time interval $t_{RAS}$ after the act of opening the bank and where $t_{RAS}$ is a parameter correlative to the memory device.

12. The method of processing a request, as set forth in claim 8, wherein the act of re-opening the bank comprises the act of re-opening the bank at a time interval $t_{RP}$ after the act of closing the bank and where $t_{RP}$ is a parameter correlative to the memory device.

13. The method of processing a request, as set forth in claim 12, wherein the act of re-opening the bank comprises the act of re-opening the bank at a time interval $t_{ACT}$ after the act of asserting the command, wherein the time interval $t_{ACT}$ is defined by the relationship:

$$t_{ACT}=(t_{DPL}+t_{RP})+BL;$$

where BL is the burst length and $t_{DPL}$ is a time interval correlative to the memory device and is defined as the time interval from the end of the data to the act of closing the bank.

14. A method of processing read requests comprising the acts of:
    opening a bank in a memory device;
    asserting a read command at a first time after the act of opening the first bank, wherein the command has a corresponding burst length;
    closing the bank at a second time, after the first time; and
    re-opening the bank at a third time after the second time wherein the third time is dependent on each of the first time and a read de-rating value stored in a configuration register.

15. The method of processing read requests, as set forth in claim 14, wherein the act of asserting a read command comprises the act of asserting a read command at a first time, wherein the first time is a burst length before the second time.

16. The method of processing read requests, as set forth in claim 14, wherein the act of closing the bank comprises the act of closing the bank at a time interval $t_{RAS}$ after the act of opening the bank and where $t_{RAS}$ is a parameter correlative to the memory device.

17. The method of processing read requests, as set forth in claim 14, wherein the act of closing the bank comprises the act of initiating an auto precharge.

18. The method of processing read requests, as set forth in claim 14, wherein the act of re-opening the bank comprises the act of re-opening the bank at a time interval $t_{RP}$ after the act of closing the bank and where $t_{RP}$ is a parameter correlative to the memory device.

19. The method of processing read requests, as set forth in claim 18, wherein the act of re-opening the bank comprises the act of re-opening the bank at a time interval $t_{ACT}$ after the act of asserting the command, wherein the time interval $t_{ACT}$ is defined by the relationship:

$$t_{ACT}=(CL+BL-2)+t_{RP}-t_{DR};$$

where CL is the CAS latency, BL is the burst length and $t_{DR}$ is the read de-rating value.

20. The method of processing read requests, as set forth in claim 14, wherein the act of re-opening the bank comprises the act of de-rating the time period between the act of asserting a read command and the act of re-opening the bank to produce the third time.

21. A method of processing write requests comprising the acts of:
opening a bank in a memory device;
asserting a write command at a first time after the act of opening the first bank, wherein the command has a corresponding burst length;
closing the bank at a second time, after the first time; and
re-opening the bank at a third time after the second time wherein the third time is dependent on a write de-rating value stored in a configuration register.

22. The method of processing write requests, as set forth in claim 21, wherein the act of asserting a write command comprises the act of de-rating the assertion of the write command to produce the first time.

23. The method of processing write requests, as set forth in claim 21, wherein the act of asserting a write command comprises the act of asserting a write command having a burst length equal to one (1).

24. The method of processing write requests, as set forth in claim 21, wherein the act of asserting a command comprises the act of asserting a write command at a first time, wherein the first time is a time interval $t_{DR}$ before the second time and wherein the time interval $t_{DR}$ is the write de-rating value.

25. The method of processing write requests, as set forth in claim 21, wherein the act of closing the bank comprises the act of closing the bank at a time interval $t_{RAS}$ after the act of opening the bank and where $t_{RAS}$ is a parameter correlative to the memory device.

26. The method of processing write requests, as set forth in claim 21, wherein the act of closing the bank comprises the act of initiating an auto precharge.

27. The method of processing write requests, as set forth in claim 21, wherein the act of re-opening the bank comprises the act of re-opening the bank at a time interval $t_{RP}$ after the act of closing the bank and where $t_{RP}$ is a parameter correlative to the memory device.

28. The method of processing a request, as set forth in claim 27, wherein the act of re-opening the bank comprises the act of re-opening the bank at a time interval $t_{ACT}$ after the act of asserting the write command, wherein the time interval $t_{ACT}$ is defined by the relationship:

$$t_{ACT}=(t_{DPL}+t_{RP})+BL;$$

where BL is the burst length and $t_{DPL}$ is a time interval correlative to the memory device and is defined as the time interval from the end of the burst length to the act of closing the bank.

* * * * *